April 11, 1944.  F. KASTILAN  2,346,312
TELEPHOTO LENS
Filed Oct. 29, 1941
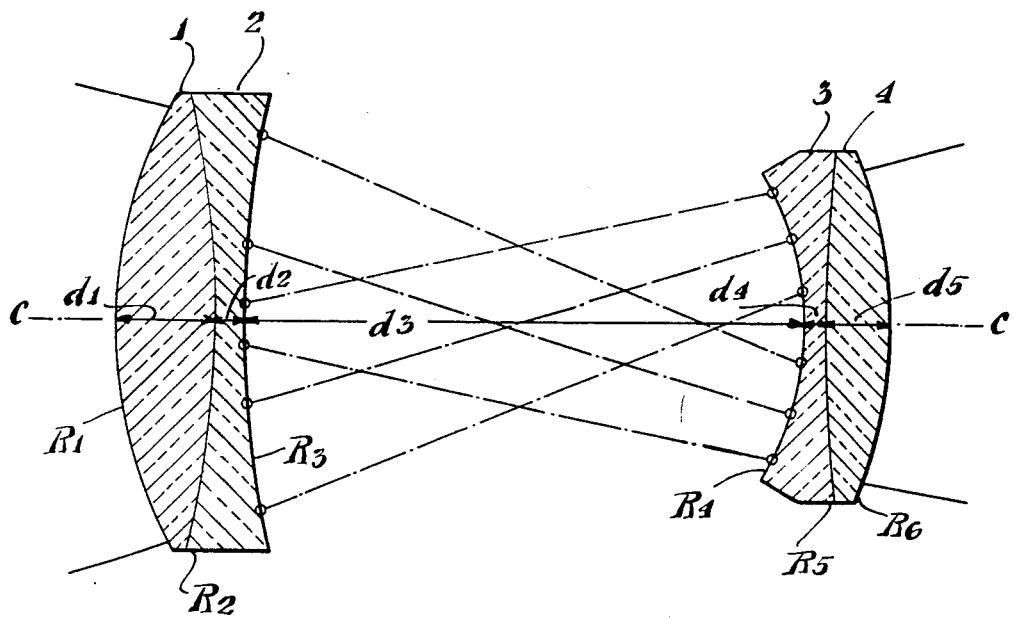
INVENTOR.
Fritz Kastilan
BY
ATTORNEYS Patented Apr. 11, 1944

2,346,312

UNITED STATES PATENT OFFICE

2,346,312

TELEPHOTO LENS

Fritz Kastilan, New York, N. Y., assignor to Bernard Chadkin, New York, N. Y.

Application October 29, 1941, Serial No. 416,929

2 Claims. (Cl. 88—57)

This invention relates to a new and improved tele-photo or tele-objective lens system which is corrected spherically, chromatically and astigmatically.

It is an object of the invention to produce a lens of these characteristics and making use of domestic optical glass which can be produced at a relatively low cost and yet compare most favorably with imported glasses.

As shown in the attached sheet of drawings, the single figure illustrates a lens assembly which comprises two positive lenses, 1 and 2, and two negative lenses, 3 and 4, assembled so as to afford the proper image on a plate that has been located for infinity. The lens illustrated has an aperture of F5.5. In the drawing, the radii of the several lenses have been indicated at R1, R2, R3, R4, R5 and R6 and the lenses 1 and 2 are cemented together along R2, while lenses 3 and 4 are cemented along R5. The diameter of compound lens 1 and 2 is 58 mm. and the diameter of compound lens 3 and 4 is 45 mm.

Construction data for a tele-photo or tele-objective lens with a focal length of +300 mm. built in accordance with my invention is as follows:
$R1=+56.0$, $R2=-115.0$, $R3=+168.1862$, $R4=-34.7$, $R5=+250.0$, $R6=-65.39157$; $d1=13.0$, $d2=4.0$, $d3=71.7$, $d4=2.5$, $d5=8.0$; $ND:1=1.5725$, $2=1.6489$, $3=1.60480$, $4=1.68950$; $V:1=57.4$, $2=33.8$, $3=38.0$, $4=30.9$.

In the above table, all measurements are given in millimeters; ND represents the index of refraction for the D line of the spectrum and V a mathematical function of indices of refraction for the D, C and F lines of the spectrum which is characteristic for the dispersion of a kind of glass.

$$V=\frac{ND-1}{NF-NC}$$

I claim:
1. A tele-objective lens comprising a positive component consisting of a first positive lens and a second negative lens cemented together, and a negative component consisting of a third negative lens and a fourth positive lens cemented together, in which the index of refraction for the D line of the spectrum is

$ND:1=1.5725$
$ND:2=1.6489$
$ND:3=1.60480$
$ND:4=1.68950$ and wherein for a focal length of 300 units $R1= +56.0$
$R2=-115.0$
$R3=+168.1862$
$R4= -34.7$
$R5=+250.0$
$R6= -65.39157$ and $d1=13.0$
$d2= 4.0$
$d3=71.7$
$d4= 2.5$
$d5= 8.0$ wherein R1 and R2 are the radii of the first positive lens; R2 and R3 the radii of the second negative lens; R4 and R5 the radii of the third negative lens and R5 and R6 the radii of the fourth positive lens; $d1$ is the diameter of the first positive lens; $d2$ the diameter of the second positive lens; $d3$ the distance between the component lenses; $d4$ the diameter of the third negative lens; $d5$ the diameter of the fourth positive lens.

2. A lens as specified in claim 1 in which $V:1=57.4$
$V:2=33.8$
$V:3=38.0$
$V:4=30.9$ wherein V is for each of the lenses a mathematical function of the indices of refraction for the D, C, and F lines of the spectrum in accordance with the formula $$V=\frac{ND-1}{NF-NC}$$

FRITZ KASTILAN.